United States Patent [19]

Clark et al.

[11] Patent Number: 4,839,471
[45] Date of Patent: Jun. 13, 1989

[54] SEALS

[75] Inventors: Gordon P. Clark, Beaconsfield; Zbigniew T. Karwowski, Dollard des Ormeaux; Henry Tebinka, Ile Bizard, all of Canada

[73] Assignee: Northern Telecom Limited, Montreal, Canada

[21] Appl. No.: 156,878

[22] Filed: Feb. 18, 1988

[51] Int. Cl.⁴ ........................................... H02G 15/113
[52] U.S. Cl. ................................... 174/92; 174/77 R; 174/93; 277/192
[58] Field of Search .......................... 174/92, 93, 77 R; 277/188 R, 189, 192

[56] References Cited

U.S. PATENT DOCUMENTS

| | | | |
|---|---|---|---|
| 2,996,567 | 8/1961 | Channell et al. | 174/92 |
| 3,692,926 | 9/1972 | Smith | 174/92 |
| 3,705,950 | 12/1972 | Jirka et al. | 174/77 R X |
| 4,103,911 | 8/1978 | Giebel et al. | 174/77 R X |
| 4,361,721 | 11/1982 | Massey | 174/92 |
| 4,405,083 | 9/1983 | Charlebois et al. | 249/97 |
| 4,538,021 | 8/1985 | Williamson, Jr. | 174/92 |
| 4,648,606 | 3/1987 | Brown et al. | 277/188 R |
| 4,704,499 | 11/1987 | Faust | 174/92 |

FOREIGN PATENT DOCUMENTS 2743937  4/1979  Fed. Rep. of Germany .... 174/77 R

Primary Examiner—Morris H. Nimmo
Attorney, Agent, or Firm—R. J. Austin

[57] ABSTRACT

Seals particularly for cable splice closures having two diametrically opposed sealing members. The sealing members are of soft material with a maximum Shore hardness of 15 and preferably a Shore hardness of 10. A sealing rib of each sealing member extends into a cavity to be occupied by the cable with the sealing members assembled together. Each sealing rib bridges axially between a seal base and a rib stiffening element which is spaced axially of the base and inwardly of the radially outer limits of the base. When assembled into a housing with the base of the seal supported by the housing, the rib stiffening element is spaced from the housing. The rib is deflected radially outwards by engagement with a cable and causes outward resilient deflection of the rib stiffening element which provides resilient support for the rib while permitting it to deflect over a wide range of diameters.

14 Claims, 3 Drawing Sheets

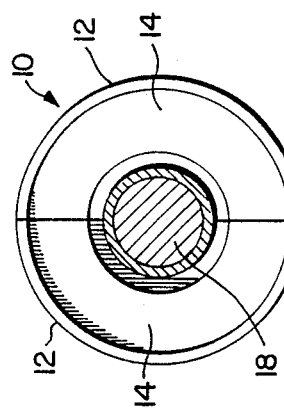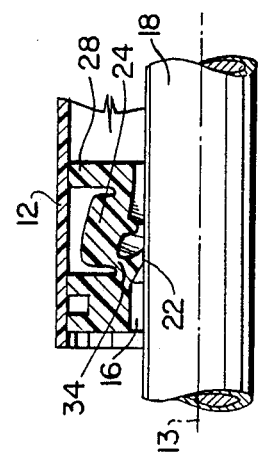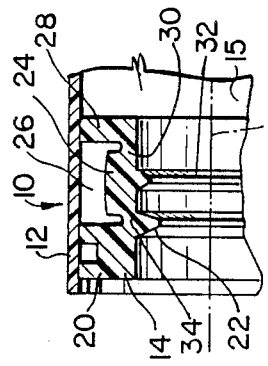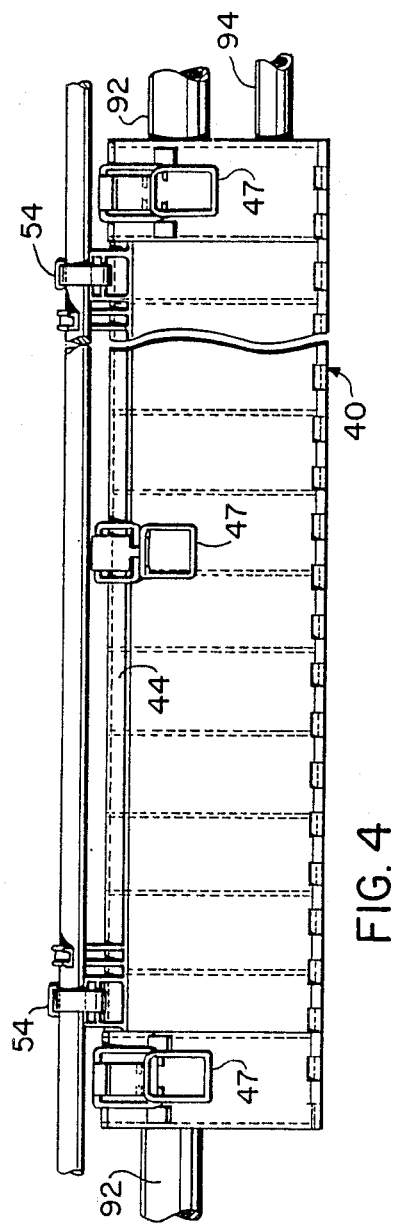

SEALS

This invention relates to seals.

In many engineering fields, seals are necessary to prevent the flow of fluids from one side of the seals to the other. Seals may be used for preventing ambient atmospheric conditions from contacting articles or devices located within an enclosure. This type of seal is necessary when providing closures around splices formed between telecommunications cables either for aerial or buried cables. So far as aerial cable is concerned, many ideas have been put forward for sealing around cables passing into a closure. In many cases, aerial closures require many parts which need assembling on site. This increases the difficulty of forming the closures and the accumulation of parts is partly caused by the type of sealing arrangements provided with the splice enclosures. To accommodate cables of various diameters, it may be necessary for different size seals to be provided. Alternatively, in one known construction of splice closure, the closure ends are provided by plastic molded tapered parts, ends of which may be removed at various desired positions to provide the internal diameter required for different size cables. A problem with this arrangement is that the end portions of the closures do not themselves seal directly upon the cables but need some additional sealing, possibly in the form of sealing tape wrapped around the end portions so as to overlap the cables.

The present invention is concerned with a seal construction which is suitable for use with aerial splice closures and which may be used successfully to seal around cables of various diameters.

Accordingly, the present invention relates to a seal comprising two elastomeric sealing members with a maximum Shore hardness of 15 and which have side surfaces defining recesses and are capable of being assembled together with their side surfaces abutting to join the recesses and define a substantially cylindrical cavity for location therethrough of a substantially cylindrical article, each member having a sealing rib extending around and projecting into its recess, the ribs lying end-to-end to provide an annular rib projecting into the cavity upon assembly of the two members, and each member is provided with a base for its sealing rib and a rib stiffening element which is disposed axially of the base, is radially resiliently movable relative to the base and to the recess, and in a normal unstressed condition, is spaced within the radial outer limits of the base, the sealing rib lying radially within and axially bridging from the base to the rib stiffening element, radial outward deflection of the rib effecting radial outward movement of the rib stiffening element towards the radial outer limits of the base.

With the construction according to the invention, because the sealing members have a low Shore hardness, then they are capable of substantial compression and flexure to enable the ribs to be flexed to a desired degree to accommodate different cable diameters. However, with such a soft material for the ribs, the ribs themselves may not be capable of having sufficient resiliency to form an effective seal against cable surfaces. There is a need therefore to provide sufficient resiliency to the ribs to enable them to provide the required sealing action throughout the range of diameters for the cylindrical article. This resiliency is provided by the rib stiffening element which is flexed outwardly as the rib is deformed upon engagement with a cylindrical article, this outward deformation also increasing the rib diameter to cover the range of cable diameters. The rib stiffening element is allowed to move outwardly because it does not extend to the outer limits of the base, thereby effectively stretching around the recess so as to resist outward deformation of the rib. Thus, although the rib is very deformable and may not offer much resistance to deformation without assistance, the combination of the rib with the rib stiffening element provides the resiliency required together with the deformation capability to provide effective sealing for a large range of diameters.

In a practical construction, the rib is interconnected to and is flexible relative to the rib stiffening element and is also interconnected with the base. Flexing of the rib around its part connected to the base causes radial outward movement of the part of the rib connected to the rib stiffening element thereby imparting a radially outward movement to the stiffening element.

The invention also includes a splice closure for telecommunications cable comprising: a closure having two housing portions which are closable together circumferentially of the closure; and two seals which are axially spaced apart along the closure, each seal comprising two elastomeric sealing members carried one by each housing portion, each sealing member of unitary construction having a maximum Shore hardness of 15 and side surfaces defining recesses, the side surfaces abutting together in the closed together condition of the housing portions to join the recesses to define a substantially cylindrical cavity for location therethrough of a substantially cylindrical article, each sealing member having a sealing rib extending around and projecting into its recess, the ribs lying end-to-end in the closed together condition of the housing portions effectively to provide an annular rib projecting into the defined cavity, and each sealing member being provided with a base for its sealing rib, the base supported by the inner surface of the associated housing portion, and a rib stiffening element which is spaced axially of the base, is radially resiliently movable relative to the base and to its recess and, in a normal unstressed condition, defines a space between the rib stiffening element and the inner surface, the sealing rib lying radially within and axially bridging from the base to the rib stiffening element, radial outward deflection of the rib effecting radial outward movement of the rib stiffening element towards said inner surface.

Embodiments of the invention will now be described by way of example with reference to the accompanying drawings in which:

FIG. 1 relates to a first embodiment and is a cross-sectional view through part of a splice closure member for a cable;

FIG. 2 is a similar view to FIG. 1 and showing a cable passing through a seal of the closure member;

FIG. 3 is an end view of the closure with cable fitted in the direction of arrow III in FIG. 2;

FIG. 4 is a side elevational view of an aerial cable splice closure according to a second embodiment of the invention and in a closed condition;

Figure 5:
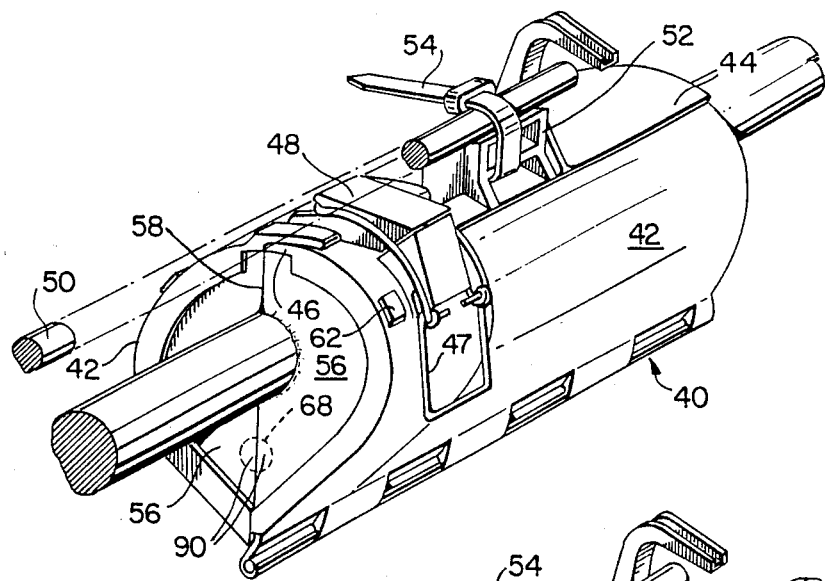
FIG. 5 is an isometric view at one end of the closure of FIG. 3 and to a larger scale.

FIGS. 1 and 2 are concerned with the first embodiment and illustrate the basic form of the invention. In FIG. 1 is shown one end of an aerial splice closure 10 comprising a substantially cylindrical metal body 10 formed by two halves 12 which are hinged together along an axial line 13 for opening and closing the body. As shown in FIG. 1, only one of the halves 12 is present. At each end of the body, there is provided a seal. Each seal is formed by diametrically opposed halves 14 defining substantially cylindrical recesses 15, the halves fitted one into each of the body parts 12 so as to close together with the recesses defining a cavity 16 for accommodating a cable 1 (FIG. 2) when the closure is fitted around a cable and is closed together. The seal is formed from a ethylene propylene terpolymer composition and has a maximum Shore hardness of 15 and preferably a maximum Shore hardness of 10. Each seal half 14 comprises a base 20 disposed at one end of the half, this base engaging the inner surface of the body portion 12.

Within each recess 16 is disposed a sealing rib 22 which is semi-circular and extends around the recess 16 while projecting into it. This sealing rib lies radially within and axially bridges from the base 20 to a rib stiffening element 24 which is disposed axially of the base as shown in FIG. 1. In a normal unstressed condition, the stiffening element 24 is spaced within the radial outer limits of the base to provide a space 26 between the stiffening element and the body portion 12. Apart from its connection to the rib 22, the stiffening element 24 is not otherwise joined to the base as can be seen from FIG. 1. On the axial side of the stiffening element 24 remote from the base 20 is provided a further base 28 which is joined to the stiffening element 24 by a narrow section 30. The base 28 extends out to the body portion 12 so as to stabilize the sealing member within the body portion.

Each sealing half also has an additional rib 32 which is spaced from the sealing rib 22 and lies directly radially within the stiffening element 24. The rib 32 serves to assist in providing resilient stiffness to the stiffening element 24 and may also itself operate as a sealing rib if a cable placed through the seal is of sufficiently large diameter.

In use, as shown in FIGS. 2 and 3, the cable 18 is located within the splice closure and the two halves 12 of the body are closed together with the seal halves also closed together to seal around the cable. In the sealing position, the sealing ribs 22 contact each other end-to-end around the cable. Each rib 22 sealingly engages the cable 18 by deflection of the sealing rib radially outwards about the part of the rib joined to the base 20. As the base 20 engages the inside surface of the closure body 12 then its own flexure is somewhat limited and the flexing movement for the rib 22 to accommodate the cable diameter is taken up by radially outward deflection of the rib stiffening element 24. As can be seen by FIG. 2, the rib stiffening element is resiliently deflected into the space 26 by deflection of the rib 22 caused by the radially outward movement of the rib around its junction with the base and towards the rib stiffening element. The junction between the rib 22 and the stiffening element 24 at position 34 (see FIGS. 1 and 2) is a weakened section whereby relative flexing of these two parts may easily take place at this position. In effect therefore, while the material of the seal is particularly soft and is easily deformable, back pressure for the rib against the cable to ensure that an effective sealing action is provided by resistance to resilient stretching of the stiffening element 24 into the space 26. As can be seen, the rib stiffening element is stabilized by its connection to the base 28 thereby assisting in the stiffening effect.

As can be seen from the first embodiment, the seal may easily accommodate any cable within a certain prescribed range and the rib 22 acts effectively to seal around the cable. For instance, in one particular design of seal, cables between 0.687 inches and 1.25 inches diameter may effectively be sealed. The rib 22 in moving radially outwards about the base 20 may assume any of a number of sealing positions and although the material is relatively soft, resilient sealing pressure is provided by the resistance to expansion of the resilient rib stiffening member 24.

In a second embodiment as shown in FIG. 4 onwards, an aerial splice closure 40 comprises a body formed by two rigid body halves 42 which are hinged together by a longitudinal hinge 43 for movement between an open position (FIG. 6) and a closed position illustrated in FIGS. 4 and 5. One body half 42 has an edge portion 44 which overlies the opposing edge 46 of the other body portion as shown in FIGS. 4 and 5. The two body halves may be closed together by the use of three overcenter wire locking devices 47 which are pivotally mounted upon one body half and latch into a recess formed in a keeper 48 on the other body half.

In use, the closure is held aerially in position in conventional fashion upon an aerial mounting strand 50 which extends between poles (not shown) and is held against a strand mounting member 52 by a strap 54.

Figure 7:
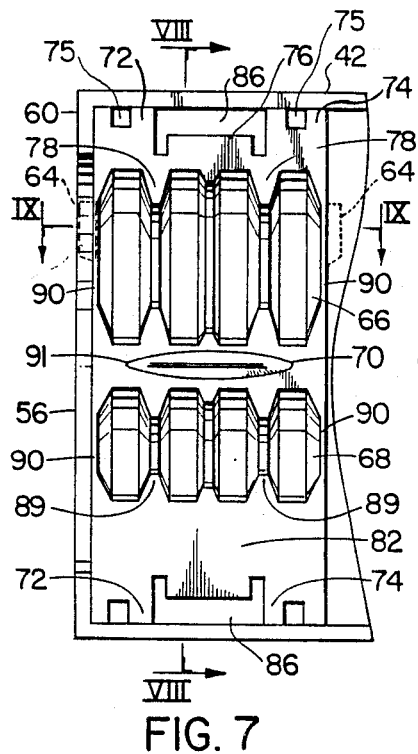
FIG. 7 is a view on part of the closure in the direction of arrow VII in FIG. 6.

At each end, the closure member 40 is provided with a seal. Each seal is formed from two sealing members, one sealing member 56 being shown in FIGS. 7 and 8. It is to be understood that the other sealing member is of opposite hand from that of FIGS. 7 and 8 so as to mate with it along a diametral centerline 58 upon assembly to provide the seal shown in FIG. 5. As shown by FIG. 7, each sealing member 56 is held within a respective body half 42 and engages an end flange 60 of the body half. Each sealing member has two outward extensions or ears 62 which, as shown in FIGS. 5, 7, 8 and 9, extend through holes in the associated body member for location purposes. Short flanges 64 on the ears 62 extend around the outside of the body members to hold the seals assembled to the body members.

Each sealing member is formed with two substantially cylindrical recesses 66 and 68 which are spaced apart by a partition 70 of the sealing member. As can be seen from FIG. 7, each sealing member has, at its axial ends, two bases 72 and 74. Each base 72 and 74 has a central groove 75 which extends completely around its base except where an ear 62 extends from the base (compare FIGS. 7 and 9). Between the bases 72 and 74 of each sealing member is disposed a cylindrical rib stiffening element 76 of similar construction to that described in the first embodiment. This rib stiffening element is only joined to the bases 72 and 74 by two axially spaced apart ribs 78 which, as in the first embodiment, axially bridge between a respective base and the rib stiffening element. Because of the provision of two recesses 66 and 68, the rib stiffening element 76 cannot extend completely around the recess 66. However, it does extend from the position shown in chain-dotted line 80 in FIG. 8 and upwardly as far as the centerline 58.

Similarly, with regard to the recess 68, the bases 72 and 74 have a rib stiffening element 82 extending between them. This rib stiffening element is thicker where it emerges at the side surface 84 (see FIG. 8) of the sealing member, but along a section between the rib 70 and the surface 84 (i.e. between lines 86 and 88) the stiffening element 82 is particularly thin.

As can be seen, neither of the stiffening elements 76 and 82 extends outwardly as far as the radial boundaries of the bases 72 and 74 so that a space 87 is provided between the stiffening elements and the body half 42. In the assembled state of the sealing members, with the body halves closed together as shown in FIG. 5, then this space 87 extends completely around the combined stiffening elements 76 and 82.

Also with regard to the recess 68, two sealing ribs 89 are provided. These ribs are axially spaced apart and bridge between the bases 72 and 74 and the stiffening element 82.

Figure 8:
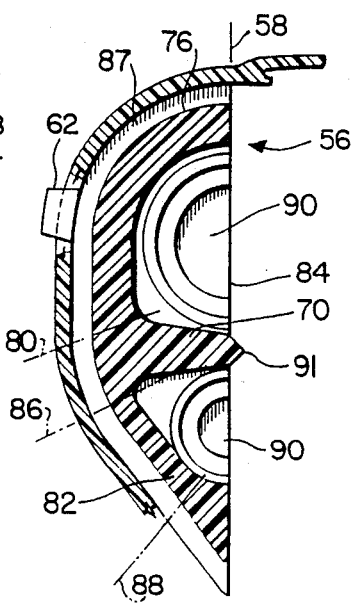
FIG. 8 is a cross-sectional view taken along line VIII—VIII in FIG. 7.
Figure 9:
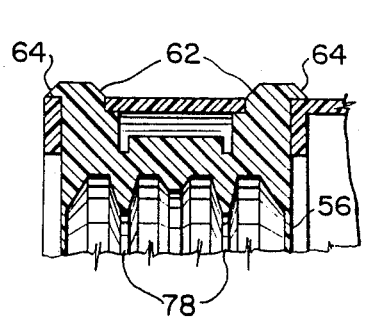
FIG. 9 is a cross-sectional view taken along line IX—IX in FIG. 7.

In addition, the sealing members 56 are each provided with resiliently flexible diaphragms 90 which close the ends of the recesses 66 and 68. The resiliently flexible diaphragms extend completely across the ends of the recesses and terminate level with the side surface 84 as shown in FIG. 8. Also, each partition 70 has a projection 91 which extends beyond its side surface 84 (FIG. 8).

Figure 6:
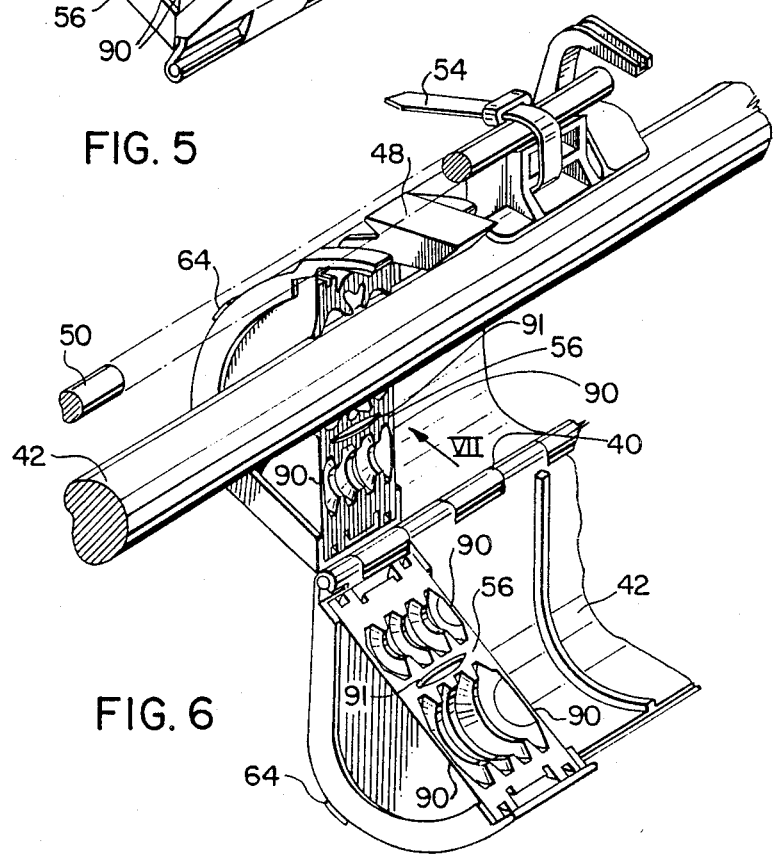
FIG. 6 is a view similar to FIG. 5 with the closure open.
Figure 10:
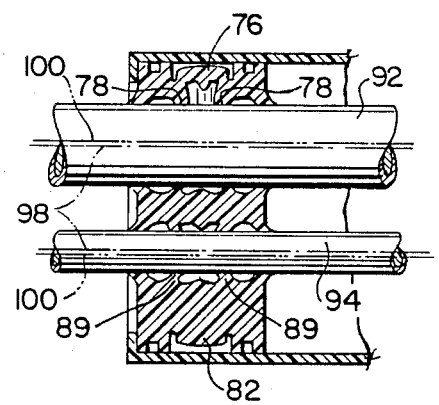
FIG. 10 is a cross-sectional view through the closure and showing two cables passing into the closure.

To enclose an aerial splice between a main cable 92 and a secondary cable 94, the closure is initially in an open position (FIG. 6) with each sealing member 56 held by the ears 62 to the respective body half 12. As can be appreciated, the closure member is preassembled in one piece before it is assembled onto the cables and may be closed around the splice region merely by aligning the cables with respective recesses of one of the sealing members at each end of the closure and then closing the body members 42 together. Thus, the open closure may be secured to the mounting strand 50 and in a completely preassembled state as shown by FIG. 6. The closing movement brings together the two sealing members 56 at each end so that they completely surround the two cables. Compression is applied across the sealing members 56 to seal them together by locking the wire locking devices 47 around the keepers 48 as shown in FIG. 5. As shown in FIG. 10, with each of the cables 92 and 94 passing through the seal at one end of the closure, each of the ribs 78 and 89 is resiliently flexed radially outwards by contact with the appropriate cable. As explained in the first embodiment, the movement of the ribs in the regions lying radially within the rib stiffening elements 76 and 82 takes place by a radial movement of the ribs outwards around their junctions to the bases 72 and 74. This results in radial outward resilient movement of the rib stiffening elements 76 and 82 into the space 86 in a manner similar to that described in the first embodiment. As will be realized, with regard to the stiffening element 82, there will be more radial movement accomplished over its thinner section between the dotted outline positions 82 and 84 in FIG. 6 than at the lower position in which the stiffening element is thicker. However, in the region of the partition 70 of each sealing member, each rib 78 and 87 cannot move radially outwards to the same degree as elsewhere because this movement is resisted by the presence of the cable on the other side of the partition. As a result not only do the sealing ribs open up radially in the desired fashion while being resiliently backed by the stiffening elements, but also the centers of the cavities so formed between the sealing members also move outwardly. This can be seen in FIG. 10 by comparing the original positions 98 of the axes of the recesses with the positions of the axes 100 of the cables after these have been positioned between the sealing members. Thus the sealing members in the embodiment operate the seal upon cables even though their resilient stiffening elements do not extent completely around each of the recesses. The resilient and flexible nature of the structure is such that although the partition 70 is relatively rigid compared to the remainder of the structure, the stiffening elements 76 and 82 may easily accommodate the extra movement required by the sealing ribs to accommodate any cable size over a desired range of diameters.

Further, during closing, the projections 91 on the partitions 70 are compressed together to ensure a fluid-tight seal between the partitions.

In addition, the diaphragms 90 open to accept the cables passing through the cavities formed by the recesses 66 and 68 and press against the cables in the assembled condition to provide a substantial seal which assists the ribs 78 and 89 in effectively sealing the inside of the closure from the outside environment. In the case however where a cable does not pass through a seal, the diaphragms effectively seal the opening from the outside environment to prevent moisture from obtaining access to the cavity of the seal and hence to the interior of the closure. By way of example, the cable 94 does not extend through both ends of the closure as can be seen from FIG. 4. The left-hand end of the closure of FIG. 3 is shown in isometric view in FIG. 4. As shown in FIG. 4, the two diaphragms 90 on the outside of the sealing members 56 are pressed against each other to provide an effective seal to prevent moisture from gaining access to the cavity defined by recesses 68 (shown dotted in FIG. 4). In addition, the diaphragms 90 at the other end of these two sealing members are also sealed together so that a double sealing effect is provided in a case where no cable passes through the appropriate cavity of the sealing member.

What is claimed is:

1. A seal comprising two elastomeric sealing members with a maximum Shore hardness of 15 and which have side surfaces each of which defines a recess, the sealing members capable of being assembled together with their side surfaces abutting to join the recesses of the sealing members together to define a substantially cylindrical cavity for location therethrough of a substantially cylindrical article, each sealing member having a sealing rib extending around and projecting into its said recess, the ribs lying end-to-end effectively to provide an annular rib projecting into the cavity upon assembly of the two members, and each sealing member is provided with a base for its sealing rib and a rib stiffening element which is spaced axially of the base, is radially resiliently movable relative to the base and to its said recess and, in a normal unstressed condition, is spaced within the radial outer limits of the base, the sealing rib lying radially within and axially bridging from the base to the rib stiffening element, radial outward deflection of the rib effecting radial outward movement of the rib stiffening element towards the radial outer limits of the base.

2. A seal according to claim 1 wherein the sealing members have a maximum Shore hardness of 10.

3. A seal according to claim 1 wherein in each sealing member, the rib has one axial part which is interconnected to and is flexible upon the base and another axial part which is interconnected to and is flexible relative to the rib stiffening element, flexing of the rib radially outputs around the one axial part causing radially outward movement of the other axial part to impart a radially outward axial movement to the rib stiffening element.

4. A seal according to claim 1 wherein in each sealing member, the rib stiffening element extends axially away from the base and beyond the rib, the rib, stiffening element attached at its end remote from the rib to another base.

5. A seal according to claim 2 wherein in each sealing member, the rib stiffening element extends axially away from the base and beyond the rib, the rib stiffening element attached at its end remote from the rib to another base.

6. A seal according to claim 1 wherein each sealing member has two ribs axially spaced apart along their recess, two axially spaced bases, one for each rib, the rib stiffening element extending axially between and axially spaced from the two bases, the bases spaced apart one axially at each side of the rib stiffening element and each rib axially bridging from its associated base to the rib stiffening element.

7. A seal according to claim 6 wherein each sealing member is formed with a resiliently flexible diaphragm disposed at one end of its recess, and with the sealing members assembled together, the diaphragms of the two sealing members abut together in the absence of a cylindrical article within the formed cavity so as to effectively close one end of the cavity.

8. A seal according to claim 7 wherein each sealing member has a flexible diaphragm at each end of its recess.

9. A seal according to claim 6 wherein each sealing member is formed with two spaced recesses with a partition between the recesses and has two axially spaced ribs in each recess, a single rib stiffening element extending between the ribs and two spaced apart bases provided for the ribs of each recess.

10. A seal according to claim 9 wherein each partition is formed with a resiliently compressible projection lying between the recesses and projecting above the side surface of the associated sealing member, the projections mutually engaging upon assembly of the sealing members to provide a seal between the partitions.

11. A seal according to claim 10 wherein each sealing member is formed with a resiliently flexible diaphragm disposed at one end of each recess and with the sealing members assembled together, the diaphragms of one sealing member abut those of the other sealing member in the absence of a cylindrical article within the formed cavity so an effectively to close one end of the cavity.

12. A seal according to claim 11 wherein each sealing member has a flexible diaphragm at each end of each recess.

13. A splice closure for telecommunications cable comprising:

a closure having two housing portions which are closable together circumferentially of the closure; and two seals which are axially spaced-apart along the closure, each seal comprising two elastomeric sealing members carried one by each housing portion, each sealing member of unitary construction having a maximum Shore hardness of 15 and side surfaces each of which defines a recess, the side surface abutting together in the closed together condition of the housing portions to join the recesses together to define a substantially cylindrical cavity for location therethrough of a substantially cylindrical article, each sealing member having a sealing rib extending around and projecting into its said recess, the ribs lying end-to-end in the closed together condition of the housing portions effectively to provide an annular rib projecting into the defined cavity, and each sealing member being provided with a base for its sealing rib, the base supported by the inner surface of the associated housing portion, and a rib stiffening element which is spaced axially of the base, is radially resiliently movable relative to the base and to its said recess and, in a normal unstressed condition, defines a space between the rib stiffening element and said inner surface, the sealing rib lying radially within and axially ridging from the base to the rib stiffening element, radial outward deflection of the rib effecting radial outward movement of the rib stiffening element towards said inner surface.

14. A splice closure according to claim 13 wherein each sealing member has two ribs axially spaced apart along their recess, two axially spaced bases, one for each rib, the rib stiffening element extending axially between and axially spaced from the two bases, and each rib axially bridging from its associated base to the rib stiffening element.

* * * * *